April 23, 1957     W. J. PLUMMER, JR     2,789,387
WEEDLESS FISHHOOK
Filed Sept. 18, 1956
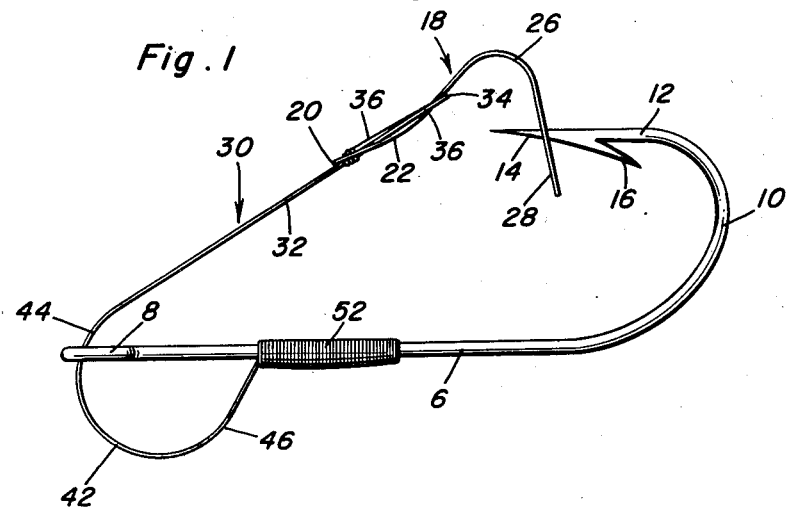
Fig. 1
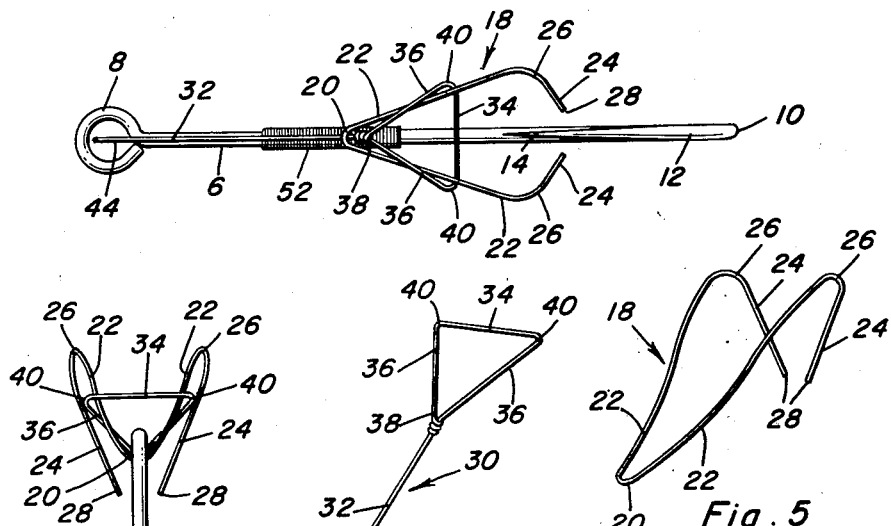
Fig. 2
Fig. 3
Fig. 4
Fig. 5
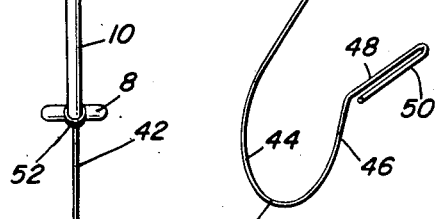
William J. Plummer, Jr.
INVENTOR.
BY
Attorneys

United States Patent Office 2,789,387
Patented Apr. 23, 1957

2,789,387

WEEDLESS FISHHOOK

William J. Plummer, Jr., Westboro, Mass.

Application September 18, 1956, Serial No. 610,493

2 Claims. (Cl. 43—43.6)

The present invention relates to a weedless fish hook chracterized by a conventional-type fish hook and a structurally and functionally improved weed guard which cooperates in a novel manner with the barbed point or bill and which is attached to and operatively mounted on the shank of the hook by a novelly designed and constructed guard attaching and supporting arm.

Briefly, a two-part weed guard construction is utilized. One part comprises a resilient wire, anti-fouling guard. This is generally V-shaped in plan and embodies a pair of yieldable, rearwardly converging limbs. The free rearward ends of the limbs are provided with laterally bent, depending terminal portions which function as fingers. These fingers straddle the point rearwardly of the tip and forwardly of the barb. The guard mounting and positioning arm is characterized by a single strand of resilient, steel equivalent wire. This is inclined upwardly towards the stated point and is yieldable toward and from the shank. The forward end portion passes downwardly through the eye of the shank and is anchored on the intermediate portion of the shank. The rearward end portion of the arm faces forwardly of the tip of the stated point and provides a gap. The guard is attached here and spans and bridges the gap with the result that a highly improved construction is had.

Experimenting with all available weedless hooks from time to time, it has been repeatedly discovered that few if any of the marketed constructions are able to cope with the various types of fish cover, for example, lily pads, floating moss, algae, and various kinds of brush and debris. The object of the instant invention is to provide a novel structural adaptation which is structurally distinct, is susceptible of attaining the desired end, and which has proved to be highly practical and effective in solving the problem of successfully catching fish regardless of the varying types of fish cover the fisherman is called upon to cope with.

Other objects, features and advantages will become more readily apparent from the following description of the details as well as the accompanying claims.

In the drawing:

Fig. 1 is a side elevational view of a fish hook equipped with the improved weedless guard means;

Fig. 2 is a top plan view of the same;

Fig. 3 is an end view taken from right to left, looking at Fig. 1;

Fig. 4 is a perspective view of the guard mounting and attaching arm; and

Fig. 5 is a perspective view of the weed guard itself.

Referring now to Figs. 1 to 3, inclusive, the conventional-type fish hook comprises the usual shank 6 having a line attaching eye 8 at the leading or forward end. At the opposite or rearward end there is the customary curvate bend 10 with a forwardly directed end portion 12 fashioned into a spearing point 14 and a rearwardly disposed, laterally directed barb 16.

The guard (Fig. 5) is fashioned from a single length of stainless steel, resilient wire of requisite gage. It is denoted generally by the numeral 18. The wire is bent upon itself midway between its ends, as at 20, into a substantially V-shaped member. The bend 20 provides a vertex or crotch portion with which the rearwardly diverging limbs 22 connects. The rear free end portions of the limbs are fashioned into lateral or depending guard fingers 24, and these join with the limbs proper by way of rounding or slow-curved bends 26. It will be noticed that the fingers converge toward each other and that the free lower ends thereof are spaced apart as at 28.

The supporting and attaching means is referred to generally as a mounting and positioning arm and is denoted by the numeral 30. Here again a single strand of stainless steel, resilient wire of requisite gage is employed. The arm proper 32 is linearly straight. The rearward end portion is bent or fashioned into a triangular loop which embodies a base potion 34 and side portions 36 which converge to and join with the arm proper as at 38 and the prime, the forward leading or apical end. The bends 40 provide corner-seats for the intermediate portions of the limbs 22 of the guard 18. As is evident from Figs. 1 to 3, the crotch portion of the guard 18 is attached to this triangular loop in such a manner that the vertex or bend 20 rests atop the arm 32 at the apical end 38 of the triangular loop. The limbs themselves are then directed beneath the portions 36 and are threaded, so to speak, through the loop, with intermediate portions in the seats 40, and then resting atop the base portion 34. The remainder of the limbs extend a distance to properly position the guard fingers. The preferred position is that shown in Fig. 1, from which it will be noticed that the guard fingers straddle the intermediate portions of the point. That is to say, they are spaced rearwardly of the tip of the point and forwardly of the barb 16. They toe-in and extend into the space between the hook portions 12 and 6, where they may be said to be located below the point 14. It will also be noted that when the arm 32 is attached, it inclines upwardly and rearwardly and extends to a position outwardly of or above the point 14, and the construction is such that a gap exists between the triangular loop and the point 14, and this gap is spanned or bridged by the limbs of the guard 18. This provides an ideal construction which operates just as intended and functions differently from other seemingly analogous weed guards. As is further evident, the forward or lower end portion of the arm 32 is fashioned into a U bend of an approximate 180° formation. This includes a rounding or curvate bight portion 42 and side portions 44 and 46. There is also the terminal end 48 of the wire which has a return bend 50. Terminal 48 and return bend 50 provide a satisfactory member which lends itself to proper attachment to the shank 6. This is usually accomplished by wrapping fine wire around the portions 48 and 50 and the shank, as denoted at 52. Of course, this construction might be varied by welding the terminal portion of the wire to the shank. In any event, the side member 46 extends downwardly at a slight oblique angle and locates the major or bight portion of the U bend below the eye-equipped end of the shank. This means, therefore, that the side member or portion 44 extends upwardly through the eye 8 where it joins the arm proper, that is, the arm 32. With the construction shown greater protection to the hook and point is assured, and also a greater amount of deflection is obtainable while protecting the hook from fouling. When a fish strikes, the guard 18 is pressed downwardly in the usual manner toward the shank of the hook. The 180° U bend eliminates the usual sharp bend when attaching the guard to the shank of the hook, thus greatly reducing breakage at this point due to the continuous bending of the guard and thus allowing the use of a heavier gage wire than could otherwise be effectively employed, especially when the guard is mounted on short-shank hooks.

My invention originated with the need for a practical and a more effective weedless hook, one that could be used in all types of fish cover, such as lily pads, moss, tules, brush and algae with equal effectiveness. By studying the various types of fish cover and being aware of the manner in which each type tends to foul the hook or lure, I have constructed and tested the weedless hook described above, which I have named "Improved Weedless Bass Hook." Although simple in design and construction, this invention contains improvements and advantages not found in other weedless hooks on the market. I used my weedless hook originally for casting the various pork baits—pork chunk, pork frogs and strips into the heavy weeds and brush where fishing is the most difficult, places where any other type of a weedless hook was of little value.

Changes in shape, size and rearrangement of parts may be resorted to in actual practice without departing from the spirit of the invention or the scope of the invention as claimed.

What is claimed as new is as follows:

1. A weedless fish hook comprising a conventional-type fish hook having a shank with a line attaching eye at its forward end and a curvate return bend at its rearward end terminating in a spearing point having a rearwardly spaced lateral barb, a guard arm embodying a single strand of spring steel wire, one end of said wire being secured to an intermediate portion of said shank, the intermediate portion having a U-bend including upper and lower side portions joined by way of a curvate bight portion, the latter and lower side portion being coplanar with and situated below said shank and the upper side portion passing upwardly through said eye, the arm proper inclining upwardly, toward said spearing point and terminating in a triangular loop and the base member of said loop terminating forwardly of said point and providing a gap between itself and said point, and a resilient wire anti-fouling guard V-shaped in plan embodying a pair of opposed upwardly inclining rearwardly diverging limbs, the vertex portion of said wire resting atop said arm adjacent to the forward apical portion of said loop, the adjacent portions of the limbs being threaded through the loop and passing rearwardly over the base member of the loop and beyond said base member and spanning and bridging said gap, the rearward end portions of said limbs inclining upwardly to a position above said spearing point and being bent laterally down and providing a pair of guard fingers, said guard fingers converging toward each other and straddling said point rearwardly of the tip of the point and forwardly of said barb.

2. As a new article of manufacture, a weed guard adapted to be mounted on and used in conjunction with a conventional-type fishhook, said guard embodying a single strand of spring steel wire the intermediate portion of which has a U-bend including upper and lower side portions joined by way of a curvate bight portion, the arm proper terminating in a triangular loop the base member of which is adapted to terminate forwardly and spaced from the point of the barbed hook portion of the aforementioned fishhook, and a resilient wire anti-fouling guard V-shaped in plan embodying a pair of opposed upwardly inclining rearwardly diverging limbs, the vertex portion of said wire resting atop said guard arm adjacent to the forward apical portion of said loop, the adjacent portions of the limbs being threaded through the loop and passing rearwardly over the base member of the loop and beyond said base member, the rearward portions of said limbs inclining upwardly and being adapted to assume a position above the spearing point of the fishhook and being bent laterally downwardly and providing a pair of guard fingers, said guard fingers converging toward each other and being adapted to straddle said point rearwardly of the tip of the point and forwardly of the barb.

References Cited in the file of this patent
UNITED STATES PATENTS

| | | |
|---|---|---|
| 1,713,122 | Gorman | May 14, 1929 |
| 2,160,347 | Walsh | May 30, 1939 |
| 2,289,265 | Heddon | July 7, 1942 |
| 2,539,605 | Bailey | Jan. 30, 1951 |